April 23, 1940.   R. B. P. CRAWFORD   2,198,305
GAS AND LIQUID CONTACT APPARATUS
Filed June 23, 1938
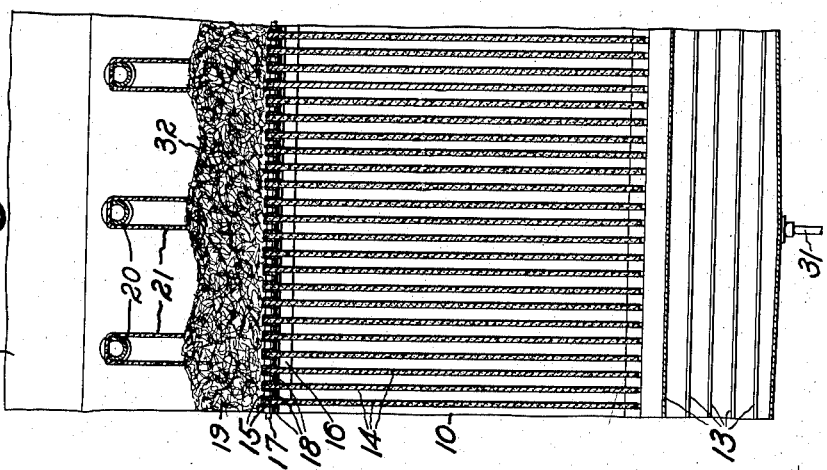
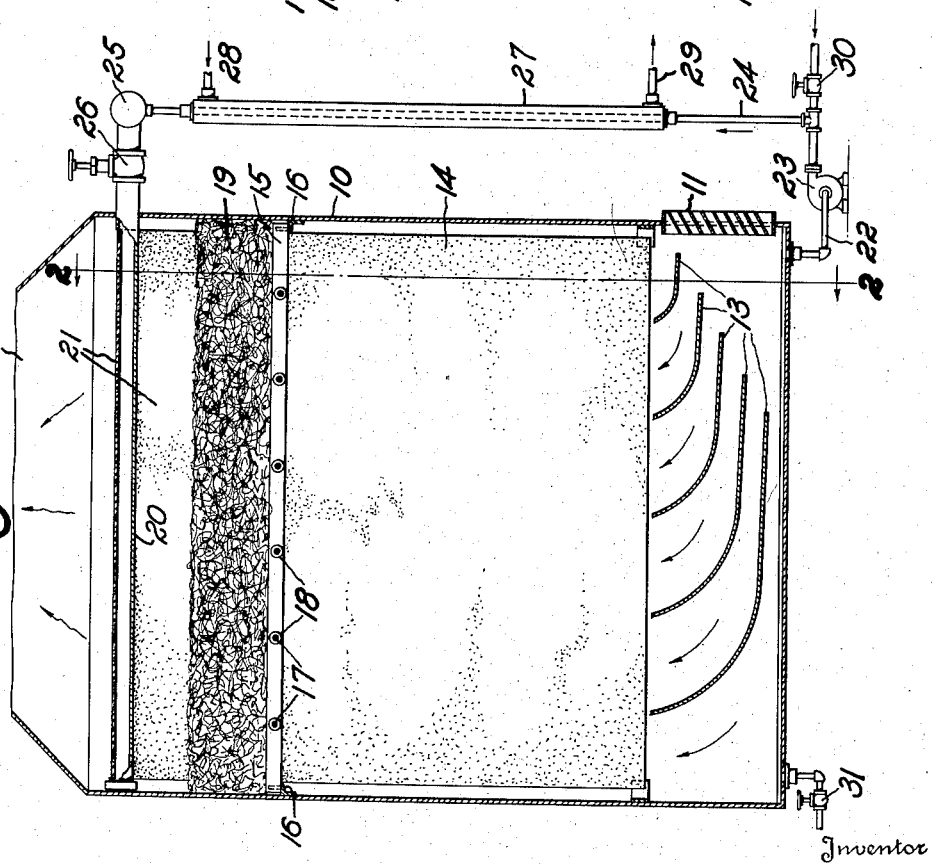
Inventor:
Robert B. P. Crawford
By Potter, Pierce & Scheffler
Attorneys.

Patented Apr. 23, 1940

2,198,305

UNITED STATES PATENT OFFICE 2,198,305

GAS AND LIQUID CONTACT APPARATUS

Robert B. P. Crawford, Miami, Fla.

Application June 23, 1938, Serial No. 215,477

10 Claims. (Cl. 261—106)

This invention relates to apparatus for contacting gases with liquids and is particularly directed to apparatus for bringing large volumes of gas into counter-current contact with relatively small volumes of liquids.

Gas and liquid contact devices heretofore available have suffered from the serious defects that at high rates of gas flow channeling of the liquid takes place resulting in uneven and inefficient contact with gas and also that relatively large amounts of liquid are frequently entrained by the gas.

A principal object of the invention is the provision of apparatus whereby gases may be contacted with liquids with substantial elimination of entrainment of the liquid by the gas.

A further object is the provision of gas and liquid contact apparatus wherein uniform distribution of gas and liquid may be obtained even at high rates of flow of the gas.

Another object of the invention is the provision of apparatus in which the flow of liquid in contact with the gas is guided by porous or closely spaced members whereby a large surface of contact is provided without the formation of spray.

These and other desirable objects are attained by means of the apparatus of the invention comprising a plurality of parallel vertical members of porous or closely spaced material, a porous or heterogeneous distributing medium in contact with the upper ends of said members, and capillary feed means for guiding liquid from liquid supply conduits to said distributing medium. The gas to be contacted with the liquid is caused to flow between contact members. In general, the greatest efficiency is obtained and the advantages of the apparatus of the invention are most apparent when the gas is caused to flow upwardly between the contact members and through the distributing medium.

The invention will be more particularly described for the purpose of illustration with reference to the accompanying drawing showing apparatus especially suited for contacting air with a moisture-absorbing medium, for example, calcium chloride brine, for the purpose of reducing the humidity of the air.

In the drawing,

Fig. 1 is a vertical sectional elevation of apparatus embodying the principles of the invention; and Fig. 2 is a fragmentary section on line 2—2 of Fig. 1.

Referring to the figures, 10 is the casing of the contactor, having a gas inlet 11 and a gas outlet 12, the gas being propelled through the contactor by a fan (not shown), which may be located in the outlet conduit. The provision of distributing vanes 13 in the lower portion of the contactor is desirable.

Contact members 14, of a suitable porous or capillary material, for example, wire-ribbed asbestos sheets, are held between sheet metal strips 15 which rest at their outer ends in slotted members 16. The upper ends of the sheets are further supported on throughbolts 17 and maintained in the desired spaced relation by means of spacing washers 18.

Spread across the top of sheets 14 and in contact with the upper ends thereof is a distributing mat 19, consisting of glass wool, Raschig rings or other material providing a large number of discontinuous surfaces of large aggregate surface area.

Liquid is supplied to the distributing mat 19 from a plurality of troughs 20, the open upper faces of which are covered with capillary or porous sheets 21 extending down on each side of the trough to contact with mat 19. The liquid contact agent collecting in the lower portion of the contactor is returned through pipe 22, pump 23 and pipe 24 to header 25. The supply of liquid to each of the distributing troughs 20 may be regulated by individual valves 26. The liquid being returned to the distributing troughs may be tempered in heat exchanger 27, by means of fluid entering at 28 and leaving at 29. Additional liquid may be supplied to the system at 30 and liquid may be removed from the system at 31.

In operation, it has been found that relatively large amounts of liquid can be uniformly supplied to sheets 14 by the arrangement described without the formation of any spray and with any substantial entrainment of liquid by the gas. The sheets 21 serve to guide the liquid flowing out of the tops of troughs 20 in smooth, spatterless streams onto distributing mat 19 which uniformly distributes the liquid flow to the upper ends of sheets 14. The arrangement of the material of the distributing mat with troughs or valleys 32 between the zones of contact with guide sheets 21 has been found to be particularly advantageous in insuring uniformity of distribution.

It will be apparent that the arrangement of the elements of the apparatus and the materials of which they are constructed are susceptible of wide variation without departing from the principles of the invention. For example, in place of the parallel fibrous contact sheets 14 shown in the drawing, there may be used self-supporting porous carbon tubes, which could be supported from below on a suitable grid. Also parallel sheets of rigid porous or closely spaced material can be used. The material need not be porous if the sheets are thin and closely spaced and the surface of the sheets has surface attraction for the wetting fluid.

I claim:

1. Gas and liquid contact apparatus providing counter-current flow between the gas and liquid comprising a chamber, a plurality of porous contact members positioned in parallel vertical relation in said chamber and spaced to provide vertical gas passages therebetween extending from the portion of the chamber below the lower ends of said members to the portion of the chamber above the upper ends of said members, a distributing mat of high aggregate surface area in contact with the upper ends of said contact members, conduits for the supply of liquid to said chamber having outlet openings above said distributing mat, porous guide members extending from the openings of said conduits to said distributing mat, gas inlet means adjacent the lower ends of said contact members and gas outlet means above said distributing mat.

2. Gas and liquid contact apparatus providing counter-current flow between the gas and liquid comprising a chamber, a plurality of porous contact members positioned in parallel vertical relation in said chamber and spaced to provide vertical gas passages therebetween extending from the portion of the chamber below the lower ends of said members to the portion of the chamber above the upper ends of said members, a distributing mat of high aggregate surface area in contact with the upper ends of said contact members, conduits for the supply of liquid to said chamber having outlet openings above said distributing mat, porous guide members extending from the openings of said conduits to said distributing mat, and conduits providing an upward flow of gas through said chamber.

3. Gas and liquid contact apparatus providing counter-current flow between the gas and liquid comprising a chamber, a plurality of sheets of porous material positioned in parallel vertical relation in said chamber and spaced to provide vertical gas passages therebetween extending from the portion of the chamber below the lower ends of said sheets to the portion of the chamber above the upper ends of said sheets, a distributing mat of high aggregate surface area in contact with the upper ends of said sheets, conduits for the supply of liquid to said chamber having outlet openings above said distributing mat, porous guide members extending from the openings of said conduits to said distributing mat, gas inlet means adjacent the lower ends of said sheets and gas outlet means above said distributing mat.

4. Gas and liquid contact apparatus providing counter-current flow between the gas and liquid comprising a chamber, a plurality of sheets of fibrous material positioned in parallel vertical relation in said chamber and spaced to provide vertical gas passages therebetween extending from the portion of the chamber below the lower ends of said sheets to the portion of the chamber above the upper ends of said sheets, a distributing mat of high aggregate surface area in contact with the upper ends of said sheets, conduits for the supply of liquid to said chamber having outlet openings above said distributing mat, porous guide members extending from the openings of said conduits to said distributing mat, gas inlet means adjacent the lower ends of said sheets and gas outlet means above said distributing mat.

5. Gas and liquid contact apparatus providing counter-current flow between the gas and liquid comprising a chamber, a plurality of porous contact members positioned in parallel vertical relation in said chamber and spaced to provide vertical gas passages therebetween extending from the portion of the chamber below the lower ends of said members to the portion of the chamber above the upper ends of said members, a distributing mat of high aggregate surface area in contact with the upper ends of said contact members, distributing troughs for the supply of liquid to said chamber having outlet openings above said distributing mat, porous guide members extending from the openings of said troughs to said distributing mat, gas inlet means adjacent the lower ends of said contact members and gas outlet means above said distributing mat.

6. Gas and liquid contact apparatus providing counter-current flow between the gas and liquid comprising a chamber, a plurality of porous contact members positioned in parallel vertical relation in said chamber and spaced to provide vertical gas passages therebetween extending from the portion of the chamber below the lower ends of said members to the portion of the chamber above the upper ends of said members, a distributing mat of high aggregate surface area in contact with the upper ends of said contact members, distributing troughs for the supply of liquid to said chamber having outlet openings above said distributing mat, fibrous sheets in contact with the openings of said troughs and extending to contact with the upper surface of said distributing mat, gas inlet means adjacent the lower ends of said contact members and gas outlet means above said distributing mat.

7. Gas and liquid contact apparatus providing counter-current flow between the gas and liquid comprising a chamber, a plurality of porous contact members positioned in parallel vertical relation in said chamber and spaced to provide vertical gas passages therebetween extending from the portion of the chamber below the lower ends of said members to the portion of the chamber above the upper ends of said members, a distributing mat of high aggregate surface area in contact with the upper ends of said contact members, conduits for the supply of liquid to said chamber having outlet openings above said distributing mat, porous guide members extending from the openings of said conduits to said distributing mat, the upper surface of said distributing mat having depressions formed therein between the zones of contact with said guide members, gas inlet means adjacent the lower ends of said contact members and gas outlet means above said distributing mat.

8. Gas and liquid contact apparatus providing counter-current flow between the gas and liquid comprising a chamber, a plurality of extended surface members positioned in parallel vertical relation in said chamber and spaced to provide vertical gas passages therebetween extending from the portion of the chamber below the lower ends of said members to the portion of the chamber above the upper ends of said members, a distributing mat of high aggregate surface area in contact with the upper ends of said contact members, conduits for the supply of liquid to said chamber having outlet openings above said distributing mat, porous guide members extending from the openings of said conduits to said distributing mat, gas inlet means adjacent the lower ends of said contact members and gas outlet means above said distributing mat.

9. Gas and liquid contact apparatus providing counter-current flow between the gas and liquid comprising a chamber, a plurality of extended surface members positioned in parallel vertical relation in said chamber and spaced to provide vertical gas passages therebetween extending from the portion of the chamber below the lower ends of said members to the portion of the chamber above the upper ends of said members, a distributing mat of high aggregate surface area in contact with the upper ends of said contact members, conduits for the supply of liquid to said chamber having outlet openings above said distributing mat, porous guide members extending from the openings of said conduits to said distributing mat, the upper surface of said distributing mat having depressions formed therein between the zones of contact with said guide members, gas inlet means adjacent the lower ends of said contact members and gas outlet means above said distributing mat.

10. Gas and liquid contact apparatus providing counter-current flow between the gas and liquid comprising a chamber, a plurality of extended surface members positioned in parallel vertical relation in said chamber and spaced to provide vertical gas passages therebetween extending from the portion of the chamber below the lower ends of said members to the portion of the chamber above the upper ends of said members, a distributing mat of high aggregate surface area in contact with the upper ends of said contact members, conduits for the supply of liquid to said chamber having outlet openings above said distributing mat, guide members extending downward from the conduits to guide the liquid to selected portions of the mat, gas inlet means adjacent the lower ends of said contact members and gas outlet means above said distributing mat.

ROBERT B. P. CRAWFORD.